US008544070B2

(12) United States Patent
Mukkara et al.

(10) Patent No.: US 8,544,070 B2
(45) Date of Patent: Sep. 24, 2013

(54) TECHNIQUES FOR NON REPUDIATION OF STORAGE IN CLOUD OR SHARED STORAGE ENVIRONMENTS

(75) Inventors: Prakash Umasankar Mukkara, Bangalore (IN); Lloyd Leon Burch, Payson, UT (US); Douglas Garry Earl, Orem, UT (US)

(73) Assignee: Novell, Inc., Provo, UT (US)

( * ) Notice: Subject to any disclaimer, the term of this patent is extended or adjusted under 35 U.S.C. 154(b) by 155 days.

(21) Appl. No.: 13/108,094

(22) Filed: May 16, 2011

(65) Prior Publication Data

US 2012/0297183 A1  Nov. 22, 2012

(51) Int. Cl.
*G06F 7/04* (2006.01)

(52) U.S. Cl.
USPC .......... 726/5; 726/1; 726/2; 726/26; 709/225; 713/155; 713/156; 713/157; 713/158; 713/159; 380/247; 380/248; 380/249; 380/250; 705/18

(58) Field of Classification Search
USPC ... 726/1–21, 26–33; 709/225; 713/155–159; 380/247–250; 705/18
See application file for complete search history.

(56) References Cited

U.S. PATENT DOCUMENTS

| 2010/0325199 | A1  | 12/2010 | Park et al. |
| 2010/0333116 | A1  | 12/2010 | Prahlad et al. |
| 2011/0087690 | A1  | 4/2011  | Cairns |
| 2011/0276490 | A1* | 11/2011 | Wang et al. ..................... 705/50 |
| 2012/0005193 | A1* | 1/2012  | Nemoto et al. ............... 707/722 |
| 2012/0131341 | A1* | 5/2012  | Mane et al. .................. 713/168 |
| 2012/0134494 | A1* | 5/2012  | Liu ................................ 380/44 |

* cited by examiner

*Primary Examiner* — Edan Orgad
*Assistant Examiner* — Roderick Tolentino
(74) *Attorney, Agent, or Firm* — Schwegman, Lundberg & Woessner, P.A.

(57) ABSTRACT

Techniques for non-repudiation of storage in cloud or shared storage environments are provided. A unique signature is generated within a cloud or shared storage environment for each file of the storage tenant that accesses the cloud or shared storage environment. Each signature is stored as part of the file system and every time a file is accessed that signature is verified. When a file is updated, the signature is updated as well to reflect the file update.

20 Claims, 5 Drawing Sheets

TECHNIQUES FOR NON REPUDIATION OF STORAGE IN CLOUD OR SHARED STORAGE ENVIRONMENTS

BACKGROUND

Cloud computing is rapidly changing the Internet into a collection of clouds, which provide a variety of computing resources, storage resources, and, in the future, a variety of resources that are currently unimagined.

However, enterprises still face many issues when migrating data to the cloud environment. For example, raw storage that traditionally was always within the controlled environment of the enterprise has now moved; in many cases, to a cloud provider's environment. In a cloud controlled environment, many individual entities (people, other software services, malicious hackers and most importantly the cloud provider's storage device or controller itself, etc.) have access to the raw storage. In other words, storage is placed in an environment where the true owner of that storage does not really know who is obtaining physical access to the storage.

Consider two scenarios where storage has moved from an enterprise to a cloud environment. In the first scenario, an enterprise chooses to make use of the storage infrastructure provided by a storage cloud provider, and the enterprise applications remain within the enterprise environment but the storage is accessed remotely over a high bandwidth connection. In the second scenario, an enterprise chooses to deploy its services within a cloud environment and both the enterprise applications and storage are within the cloud environment. In both the scenarios, it would be extremely advantageous for the cloud provider to guarantee the enterprise that the data written into remote cloud storage is written by the enterprise and not by any other entity.

In fact, many cloud providers have Service Level Agreements (SLAB) with enterprises, which include the guaranteed availability of their data and services, but not guaranteed non-repudiation of storage data modification. The main issue stems from the fact that the remote storage infrastructure consists of storage controllers (storage appliances that sit in front of the raw-storage), which accommodate multiple enterprises (multi-tenant). Without storage non-repudiation capabilities at the remote storage controllers of the cloud storage infrastructures, enterprises are reluctant to embrace the use of cloud storage for sensitive and confidential data.

As an enticement to increase remote storage participation, some vendors offer encryption as a mechanism for providing non-repudiation of storage data. The encryption technique requires that the enterprise applications manage encryption keys. So, the way non-repudiation is provided is that only the application, which owns a private key, can either read or write the data and hence if the data is modified, it is the application (or tenant) that wrote the data. This technique has a huge performance bearing on the processing of data. The data becomes useless when either the private keys are lost by the application or when the data needs to be moved to another cloud provider's premise.

Thus, if an enterprise does not want to suffer performance degradation when accessing its remote storage and/or does not want to manage their own keys, then a cloud provider presently lacks the technology to ensure and prove that only a proper tenant is modifying the enterprise's data. As a result, enterprises have not fully embraced outsourcing the management of their storage to remote environments.

SUMMARY

Various embodiments of the invention provide techniques for non repudiation of storage in cloud or shared storage environments. Specifically, a method for non repudiation of storage is provided.

A principal is authenticated, via principal-supplied credentials within a shared-storage environment and the principal is identified as requesting a first access to the shared-storage environment. A public key and a private key are generated for the principal and the public key and private key are in a secret store within the shared-storage environment. A write request is received from the principal for a file to be stored in the shared-storage environment and the public key and private key are supplied to the principal. Next, a signature for contents of the file is generated using the private key of the principal. The file and a control data structure for the file are then stored in the shared-storage environment; the control data structure includes the public key and the signature.

DETAILED DESCRIPTION

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

As used herein the terms "principal" and "tenant" may be used synonymously and interchangeably.

It is also noted that a single resource can include other resources. For example, a machine resource can include a variety of hardware and software resources. A virtual machine (VM) is also a type of resource that logically represents a machine.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-5.

Figure 1:
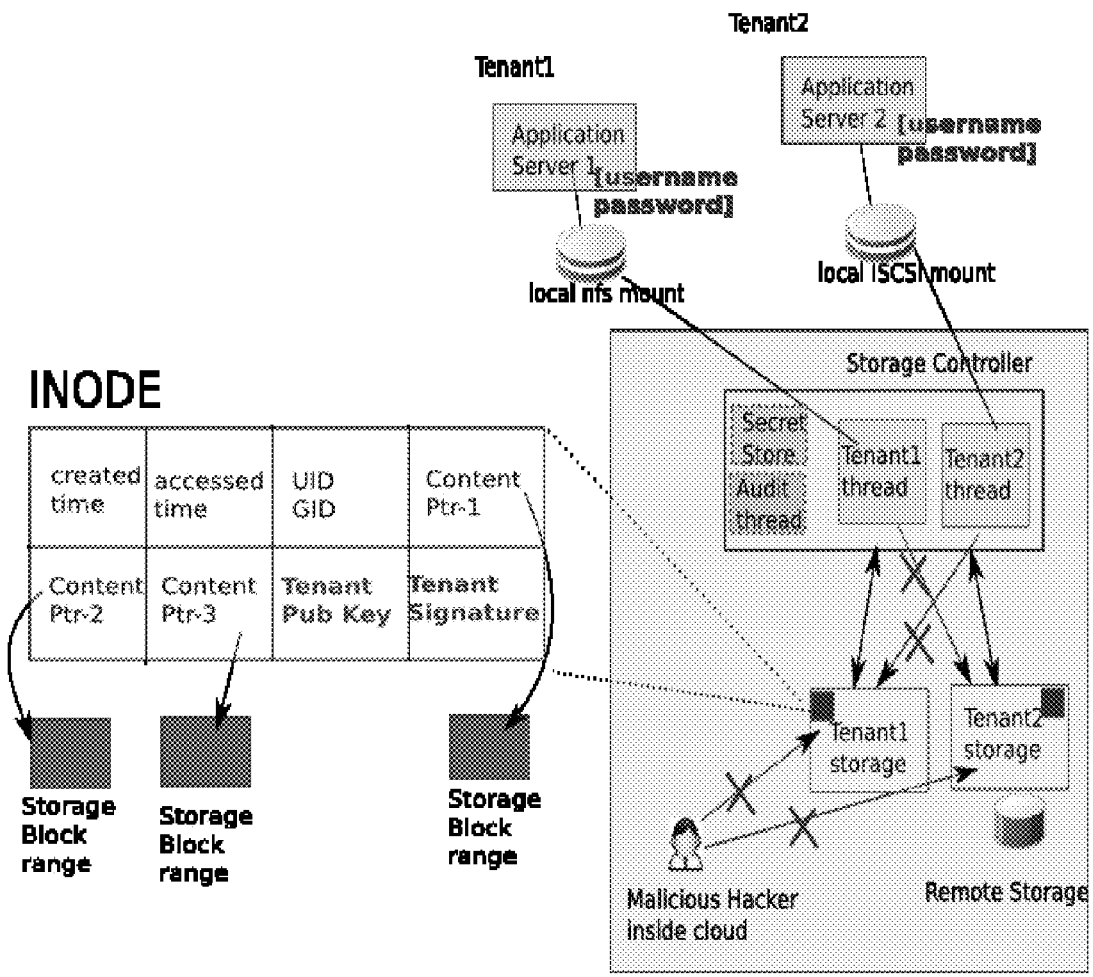
FIG. 1 is a diagram of an example architecture for non-repudiation of remote storage, according to an example embodiment.

FIG. 1 is a diagram of an example architecture for non-repudiation of remote storage, according to an example embodiment. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured and programmed (via the non-transitory computer-readable medium) to execute the components.

Figure 2:
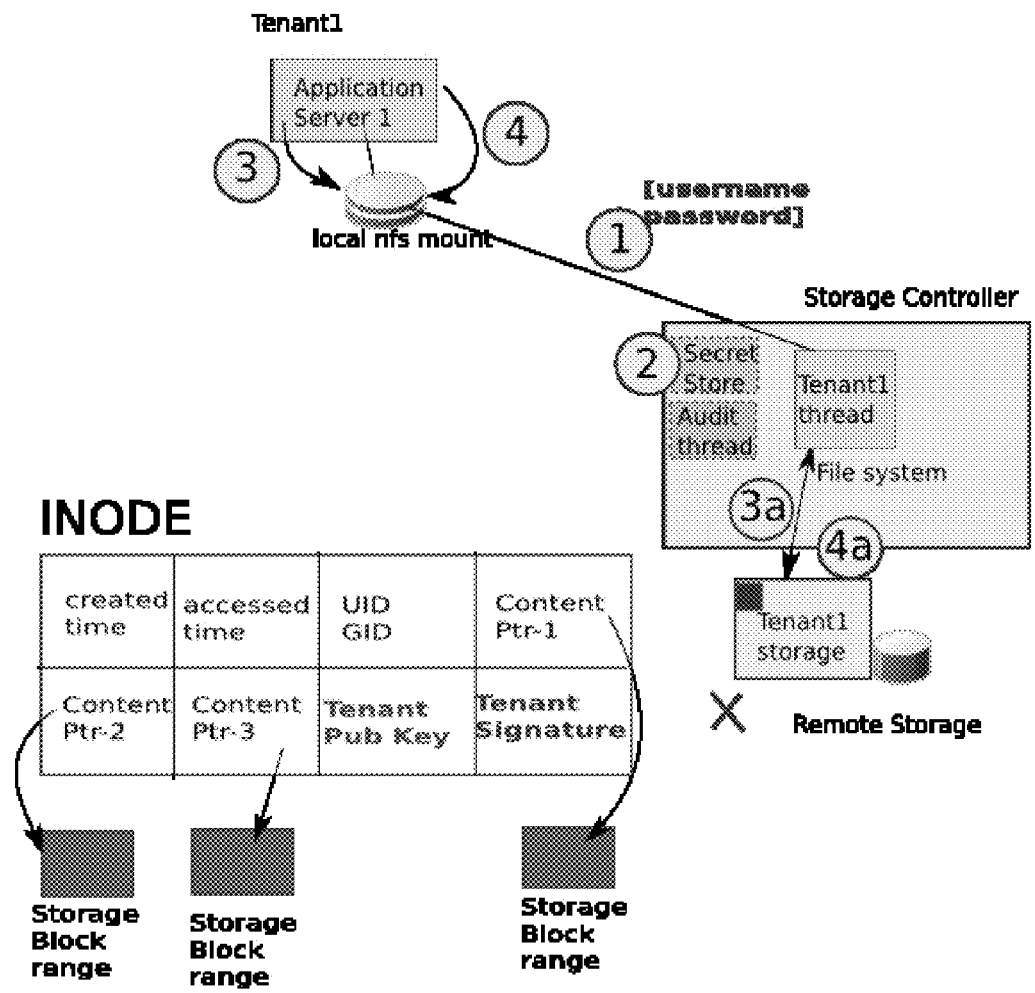
FIG. 2 is a diagram of another view of the architecture for the non-repudiation of remote storage shown in the FIG. 1, according to an example embodiment.

Specifically, the FIG. 1 describes the context and components of the architecture whereas the FIG. 2 describes in greater detail how the components cooperate to provide a mechanism for non-repudiation of cloud or shared storage.

It is noted that although these components are described in some cases from a UNIX or LINUX operation system (OS) (specifically with reference to inodes) that the techniques herein are not limited to any particular OS or file system for any particular OS.

As presented in the FIG. 1, the "INODE" is a regular file system control data structure (presented for illustrative purposes from the perspective of UNIX or LINUX) for files of that file system. Two reserved fields are used (or one reserved field) to keep the file's digital signature, tenant's (or principal's) public key and a symmetric key encrypted with the public key of the tenant.

The "Secret Store" is a novel secret store that is maintained on the storage controller or the file system. The secret store includes, by way of example, the public-private x509 key pairs of each tenant. The tenant thread (processing transaction) gets access to the key pair only with the possession of tenant's credentials, which are provided when a mount is performed between the application server and the storage controller.

The "Tenant Signature" (contents of the file) is signed by using the private key of the tenant.

The "Tenant Pub Key" is the public key of the tenant. The signature can be verified by the cloud provider or shared storage environment any time by using the public key.

As shown in the FIG. 1, the architecture provides the ability to achieve non-repudiation of storage in a cloud or shared storage environment. As described in greater detail herein and below, the embodiments herein involve mechanisms in which a unique digital signature can be generated for each cloud tenant (application server, principal, etc.) and store that signature as part of the inode (internal native file system structure) of a given file system. So, every time a file needs to be modified the file system checks to see if the digital signature is valid, and if so, the file is updated and the signature is updated. Moreover, optionally, before every read, the signatures are verified.

The FIG. 2 now expands on the architecture of the FIG. 1 and describes the mechanisms presented herein for storage non-repudiation in greater detail.

FIG. 2 is a diagram of another view of the architecture for the non-repudiation of remote storage shown in the FIG. 1, according to an example embodiment. That is, the FIG. 2 shows some additional detail that augments and enhances the discussion of the FIG. 1. Again, the specific architectural layout is presented for purposes of illustration and comprehension only and it is noted other arrangements can be used without departing from the teachings presented herein.

Specifically, the FIG. 1 presented the context and nomenclature for discussing the techniques of storage non-repudiation in greater detail.

The FIG. 2 is discussed with reference to an example sequence of file reads and writes occurring in a cloud or shared storage environment, where transaction-based signature generation and verification is achieved.

Initially, the application server performs a mount to the remote file system. This necessitates that the tenant's (principal's) credentials are supplied to the remote storage controller.

Then, the storage controller checks to see if the tenant has a secret store entry. If the transacting tenant is interacting with the cloud or shared storage environment for a first time, then a unique X509 key pair is generated and a secret store entry is created. The key pair is kept in the secret store. The secret store entry is protected and requires the tenant's credentials to gain access to the key pair.

The application server then issues a file write to the local storage. The issued write results in a remote file write request on tenant1's thread to the storage controller.

File contents are signed with the private key of the tenant. The public key and private key of the tenant are obtained by the tenant1's thread, which can be obtained by unlocking the secret store. Again, the public key and the signature are stored on the inode. The secret store can only be unlocked by the tenant1's thread, which had access to the tenant1's credentials.

Next, the application server issues a file read to the local storage. This results in a remote file read request on the tenant1's thread to the storage controller.

The tenant1's thread verifies the signature before issuing a file read. To verify the signature, the storage controller uses the public key, which is stored in the inode of the file itself.
Non-Repudiation:

The cloud provider is able to prove that the contents of the file are written to only by the tenant1's thread because the signature of the file contents can be generated only with the private key and to prove the signature, the public key is stored on the inode along with the signature.
Non-Repudiation for File System Access and File System Writes:

An audit module that is part of tenant1's thread generates an audit event for each file system read and file system write.

These audit events are signed using the private key of the tenant1's thread. The cloud provider can use these audit logs as a proof of using the storage. This mechanism is also useful for the cloud or shared storage environment provider if the provider is charging for the storage based on the file system read and writes or the amount of data being transferred.

Backward Compatibility:

If the tenant (principal) wants to move its data to another cloud provider, or the tenant looses its credentials, then the stored data is available for reading; as the data is not encrypted to provide non repudiation, so the data is backward compatible for reading.

Migration to Other File Systems:

The data can be migrated to any other file system by stripping the signature and public key present in the inode. A file system migration utility can then be provided for migrating the data to other desired file systems.

The embodiments discussed above and below provide techniques in which non-repudiation can be achieved for storage in multi-tenant cloud environment. These techniques can be used on any modern file system to achieve the desired results of non-repudiation of shared or cloud storage.

The non-repudiation of storage can be applied not only in the cloud storage environment, but also in a typical virtual machine (VM) environment. In a typical VM, the host computer has the raw storage and guest computer has the logical storage disks. The physical storage is shared among multiple guest computers. The non-repudiation techniques described herein can be used by the guest and host computers having the same file system. This is a novel differentiation in the VM industry, as every computing operation is moving towards running on a VM, even within the enterprises (private clouds).

These techniques can be also used in a personal computer or processor-enabled device, where each tenant is nothing but each user (another type of principal). The OS has multiple users (on any typical WINDOWS or LINUX processing device) and they share the same physical storage. Currently, the OS controls the access to the storage and prevents cross writing of the data among different users. However, there is no way you can prove that the data written to a particular user's area is written only by the intended user and not by the other users or the OS itself. So, the techniques herein also provide for novel features for releases of different types of OS's.

Figure 3:
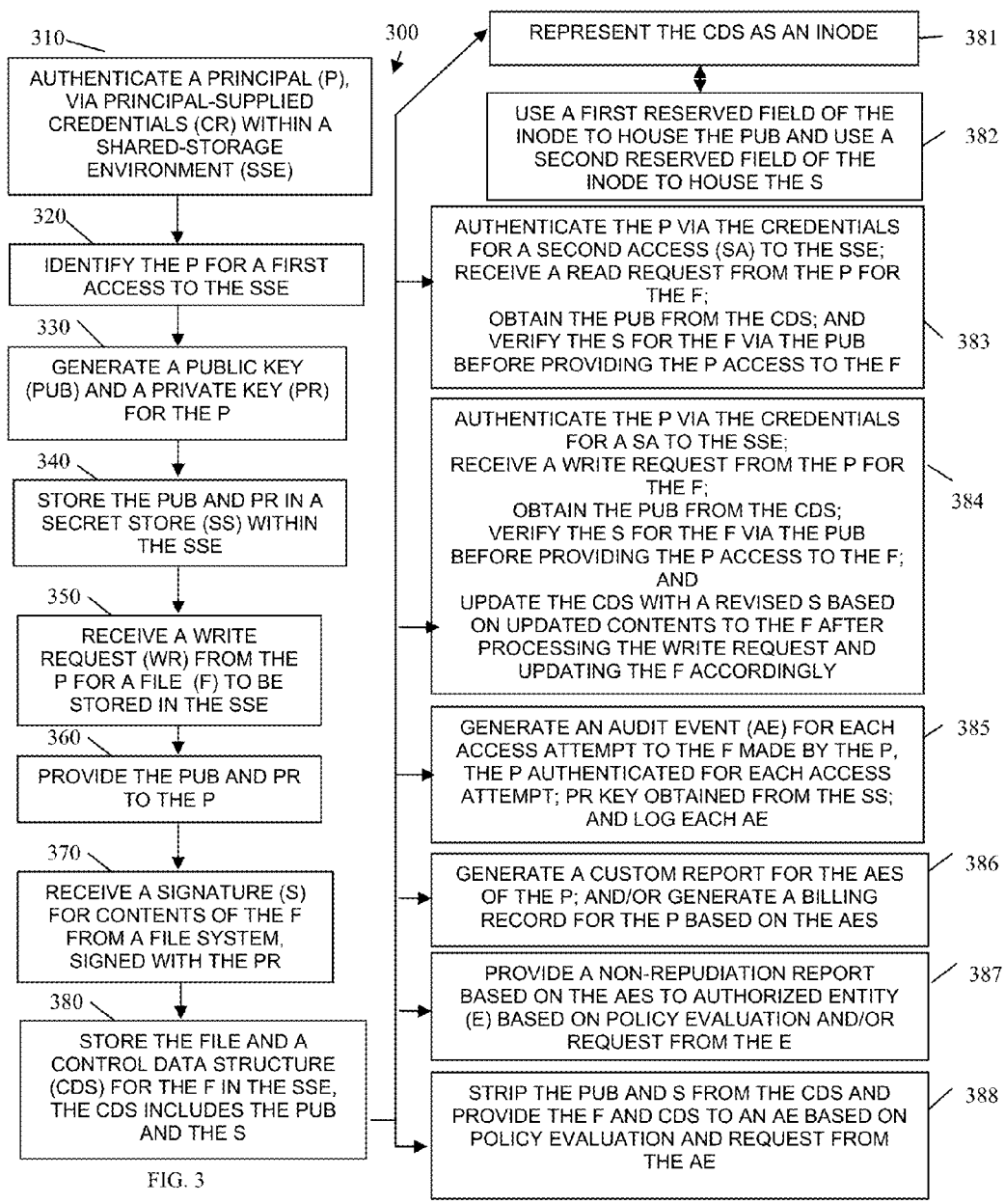
FIG. 3 is a diagram a method for remote storage non-repudiation, according to an example embodiment.

FIG. 3 is a diagram a method 300 for remote storage non-repudiation, according to an example embodiment. The method 300 (hereinafter "storage non-repudiation manager") is implemented, programmed, and resides in a non-transitory computer-readable storage medium for execution on one or more hardware processors of a network. The network may be wired, wireless, or a combination of wired and wireless.

In an embodiment, the storage non-repudiation manager implements, inter alia, the features of the FIGS. 1 and 2 presented above.

At 310, the storage non-repudiation manager authenticates a principal, via principal-supplied credentials, within a shared-storage environment. In an embodiment the principal is a process thread (automated application) for a storage tenant of the shared-storage environment that remotely accesses the shared-storage environment over a network connection. In an embodiment, the network connection is the Internet. In another embodiment, the shared-storage environment is part of a VM or a single user device having multiple users that access that device. The principal-supplied credentials can be a principal identifier and password combination, a principal identity assertion, a certificate, a token, etc. The principal is attempting to outsource storage onto the shared-storage environment.

It is noted that the discussion of the storage non-repudiation manager assumes that an authorized principal is successfully authenticated via the principal-supplied credentials for access to the shared-storage environment; however, it is to be understood that unauthorized attempts or attempts that cannot be authenticated can be made as well. But, in these situations access is denied, the failed attempts are logged, notifications are sent to appropriate entities, and/or reports are generated.

At 320, the storage non-repudiation manager identifies the principal as making a first access to the shared-storage environment. That is, the principal includes no storage that is outsourced for storage management to the shared-storage environment and is requesting a first access to being populating the principal's storage within the shared-storage environment.

At 330, the storage non-repudiation manager generates a public key and private key (public-private key pair) for the principal based on an authenticated identity for the principal for access to the shared-storage environment.

At 340, the storage non-repudiation manager stores the public key and the private key in a secret store within the shared-storage environment. The secret store is accessible from only within the shared-storage environment and access is only granted to the principal when the principal is authenticated for an access session with the shared-storage environment. So, the principal-supplied credentials are needed to obtain access to the secret store for purposes of gaining access to the public and private key pair.

At 350, the storage non-repudiation manager receives a write request from the principal for a file to be stored in the shared-storage environment.

At 360, the storage non-repudiation manager provides the public key and the private key to the principal. Again, the principal is authenticated and has provided principal-supplied credentials for access to the shared-storage environment. In some cases, it may also be advantageous to re-request that the principal supply the principal-supplied credentials even when already authenticated in the shared-storage environment to gain access to the public-private key pair housed in the secret store for the principal and within the shared-storage environment.

At 370, the storage non-repudiation manager receives a signature for contents of the file from the principal. The signature is signed by the principal using the private key.

At 380, the storage non-repudiation manager stores the file and a control data structure for the file in the shared-storage environment. The control data structure has the metadata for the file and is used by the native file system of the shared-storage environment. Moreover, the control data structure includes the public key of the principal and the signature for the file (file contents signed with the private key of the principal).

According to an embodiment, at 381, the storage non-repudiation manager represents the control data structure as an inode. Continuing with the embodiment of 381 and at 382, the storage non-repudiation manager uses a first reserved field of the inode to house the public key and uses a second reserved field of the inode to house the signature.

In another scenario, at 383, the storage non-repudiation manager subsequently authenticates the principal via the principal-supplied credentials for a second access to the shared-storage environment. Next, a read request for the file is received from the principal. In response, the storage non-repudiation manager obtains the public key from the control data structure of the file and verifies the signature for the file via the public key before providing the principal access to the file, via the principal-requested read request of the file.

In still another circumstance, at 384, the storage non-repudiation manager authenticates the principal via the principal-supplied credentials for a second access to the shared-storage environment. Next, a write request for the file is received from the principal. In response, the storage non-repudiation manager obtains the public key from the control data structure of the file and the storage non-repudiation manager verifies the signature for the file via the public key before providing the principal with access to the file for purposes of processing the write request. Then, the storage non-repudiation manager updates the control data structure with a revised signature based on updated contents to the file after the principal processes the write request against the file; the changed file is also updated accordingly within the shared-storage environment.

In another case, at 385, the storage non-repudiation manager generates an audit event for each access attempt (read and write) that the principal makes to the file within the shared-storage environment. Again, the principal is authenticated for each such access attempt. For each audit event, the storage non-repudiation manager acquires the principal's private key from the secret store within the shared-storage environment and signs that audit event. Each signed audit event is then logged by the storage non-repudiation manager within the shared-storage environment.

Continuing with the embodiment of 385 and at 386, the storage non-repudiation manager generates a custom report for the audit events captured by the storage non-repudiation manager for the principal and/or generates a billing record based on the audit events.

Still continuing with the embodiment of 385 and at 387, the storage non-repudiation manager provides a non-repudiation report based on the audit events of the principal to an authorized entity based on policy evaluation and/or a valid request from the authorized entity.

In yet another circumstance, at 388, the storage non-repudiation manager strips the public key and the signature from the control data structure and then provides the file and the control data structure to an authorized entity based on policy evaluation and/or a valid request for the authorized entity. This may be a feature when the file is being migrated off the shared-storage environment as discussed above with reference to the FIG. 2.

Figure 4:
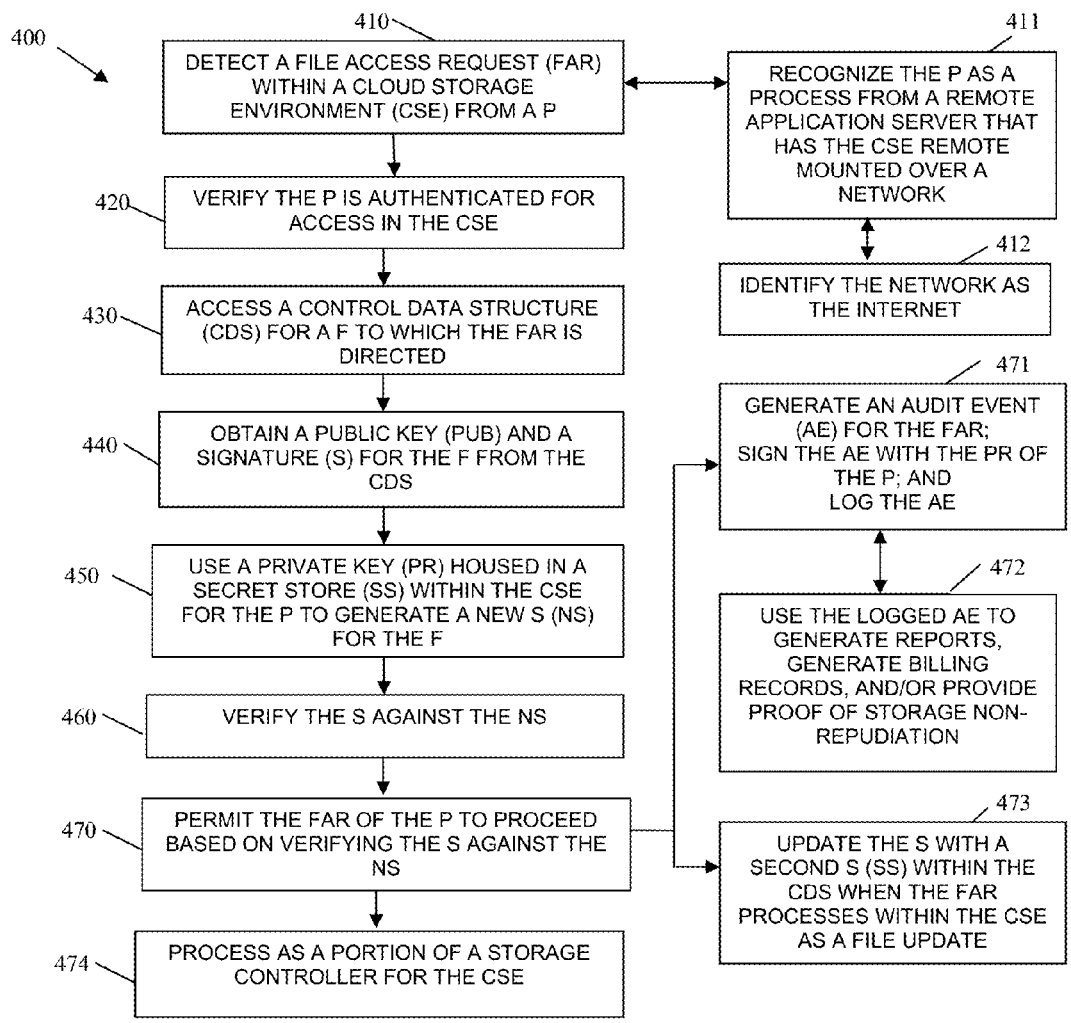
FIG. 4 is a diagram of another method for remote storage non-repudiation, according to an example embodiment.

FIG. 4 is a diagram of another method 400 for remote storage non-repudiation, according to an example embodiment. The method 400 (hereinafter "cloud storage non-repudiation manager") is implemented, programmed, and resides within a non-transitory computer-readable or processor-readable medium that executes on one or more hardware processors of a network. Moreover, the cloud storage non-repudiation manager is operational over a network and the network may be wired, wireless, or a combination of wired and wireless.

The cloud storage non-repudiation manager presents another and in some cases enhanced and/or specific perspective of the storage non-repudiation manager represented by the method 300 of the FIG. 3.

The cloud storage non-repudiation manager is presented from the perspective of a cloud storage environment and from the perspective that a principal has already established storage in that cloud storage environment, such as through the actions discussed above with reference to the FIG. 3.

It is within this context that the discussion of the FIG. 4 and the cloud storage non-repudiation manager is now presented.

At 410, the cloud storage non-repudiation manager detects a file access request within a cloud storage environment. The file access request originating from a principal (storage tenant thread or process). The principal is initiated from a remote environment to the cloud storage environment over a network connection.

According to an embodiment, at 411, the cloud storage non-repudiation manager recognizes the principal as a process from a remote application server that has the cloud-storage environment remote mounted over the network. In a specific case, at 412, the cloud storage non-repudiation manager identifies the network as the Internet.

At 420, the cloud storage non-repudiation manager verifies the principal is authenticated for access to the cloud-storage environment. Again, this can be achieved in the manners discussed above with respect to the FIGS. 1-3 and it is assumed that the principal is authenticated because only authenticated access is processed in the manners discussed herein to provide storage non-repudiation.

At 430, the cloud storage non-repudiation manager accesses a control data structure (metadata) for a file to which the file access request is being directed by the principal.

At 440, the cloud storage non-repudiation manager obtains a public key and a signature for the file from the control data structure.

At 450, the cloud storage non-repudiation manager uses a private key housed in a secret store within the cloud-storage environment for the principal to generate a new signature for the file (based on the file contents).

At 460, the cloud storage non-repudiation manager verifies the signature (from the control data structure) against the new signature (generated with the private key by signing the exiting contents of the file).

At 470, the cloud storage non-repudiation manager permits the file access request to proceed based on verifying the signature against the new signature. Again, it is assumed that verification is achieved for purposes of the discussion presented herein. If verification is not achieved, then a variety of automated actions can be taken when denying the file access request, these actions can be defined in dynamically evaluated policies.

According to an embodiment, at 471, the cloud storage non-repudiation manager generates an audit event for the file access request and signs the audit event with the private key of the principal. The signed audit event is then logged within the cloud-storage environment by the cloud storage non-repudiation manager.

Continuing with the embodiment of 471 and at 472, the cloud storage non-repudiation manager uses the logged audit event to generate reports, generate billing records, and/or provide proof of storage non-repudiation.

In another case, at 473, the cloud storage non-repudiation manager updates the signature with a second signature within the control data structure of the file when the file access request processes within the cloud-storage environment as a file update operation to the file.

In yet another situation, at 474, the cloud storage non-repudiation manager processes as a portion of a storage controller for the cloud-storage environment. That is, the cloud storage non-repudiation manager is part of the storage controller within the cloud-storage environment so that the actions of storage no-repudiation are achieved at the storage controller level of the cloud-storage environment architecture.

Figure 5:
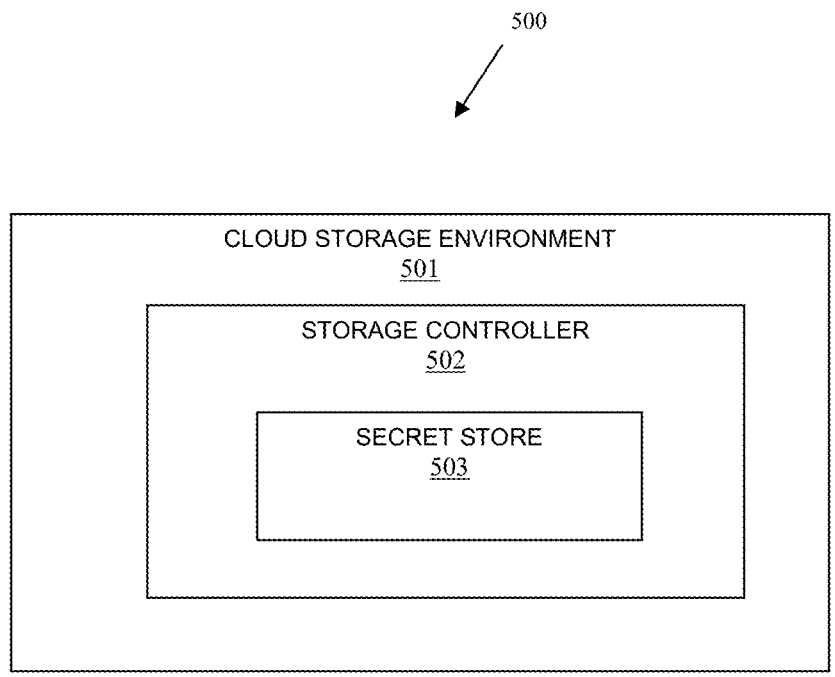
FIG. 5 is a diagram of a remote storage non-repudiation system, according to an example embodiment.

FIG. 5 is a diagram of a remote storage non-repudiation system 500, according to an example embodiment. The components of the remote storage non-repudiation system 500 are implemented, programmed, and reside within a non-transitory and computer or processor-readable storage medium for purposes of executing on one or more hardware processors of a network. The network may be wired, wireless, or a combination of wired and wireless.

The remote storage non-repudiation system 500 implements, inter alia, various aspects of the FIGS. 1-4.

The remote storage non-repudiation system 500 includes a cloud storage environment 501, a storage controller 502, and a secret store 503. Each of these components and their interactions with one another will now be discussed in detail.

The cloud storage environment 501 includes one or more processors and storage devices that are accessible over a network connection, such as the Internet for purposes of managing storage remotely for principals (storage tenants via their processing threads that interact with the cloud storage environment 501.

The cloud storage environment 501 is configured to be remote mounted over a network with an application server of a principal when the principal authenticates with credentials.

The storage controller 502 is implemented in a non-transitory machine-readable storage medium and processes on one or more processors of the cloud storage environment 501. Example features and processing of the storage controller 502 were presented in detail above with reference to the FIGS. 1-4.

The storage controller 502 is configured to maintain files for the principal within the cloud storage environment 501. Each file has a control data structure (metadata) with a public key for the principal and a signature for that file, which is signed with a private key of the principal. Again, the details with respect to this were presented above with reference to the FIGS. 1-4.

The secret store 503 is implemented in a non-transitory machine-readable storage medium of the cloud storage environment 501. Aspects of the secret store 503 were presented in detail above with reference to the FIGS. 1-4.

The secret store 503 houses a public key and a private key for the principal.

The control data structure and the secret store 503 used for providing storage non-repudiation via the processing of the storage controller 502 as presented above with respect to the FIGS. 1-4.

According to an embodiment, the storage controller 502 is configured for generating an audit event for each file access attempt made by the principal for files within the cloud storage environment 501. Also, the storage controller 502 is configured to sign and log each audit event with the private key of the principal obtained from the secret store 503.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:

authenticating a principal, via principal-supplied credentials within a cloud storage environment;

identifying the principal for a first access within the cloud storage environment;

generating a public key and a private key for the principal within the cloud storage environment;

storing the public key and private key in a secret store within the cloud storage environment;

receiving a write request from the principal for a file to be stored within the cloud storage environment while the principal is still authenticated and only when the principal is authenticated for an access session with the cloud storage environment;

granting access to the public key and private key to the principal within the shared-storage environment and through the authenticated access session;

subsequently for each write request made by the principal within the cloud storage environment, the principal is re-authenticated;

receiving a signature for contents of the file from a file system, signed with the private key, within the shared-storage environment; and storing the file and a control data structure for the file within the cloud storage environment, the control data structure including the public key and the signature.

2. The method of claim 1 further comprising:

authenticating the principal via the credentials for a second access to the shared-storage environment;

receiving a read request from the principal for the file;

obtaining the public key from the control data structure; and verifying the signature for the file via the public key before providing the principal access to the file.

3. The method of claim 1 further comprising:

authenticating the principal via the credentials for a second access to the shared-storage environment;

receiving a write request from the principal for the file;

obtaining the public key from the control data structure;

verifying the signature for the file via the public key before providing the principal access to the file; and updating the control data structure with a revised signature based on updated contents to the file after processing the write request and updating the file accordingly.

4. The method of claim 1 further comprising:

generating an audit event for each access attempt to the file made by the principal, the principal authenticated for each access attempt;

signing each audit event with the private key obtained from the secret store; and logging each audit event.

5. The method of claim 4 further comprising, generating a custom report for the audit events of the principal.

6. The method of claim 4 further comprising, generating a billing record for the principal based on the audit events.

7. The method of claim 4 further comprising, providing a non-repudiation report based on the audit events to authorized entity based on policy evaluation and/or request from the authorized entity.

8. The method of claim 1 further comprising, stripping the public key and signature from the control data structure and providing the file and control data structure to an authorized entity based on policy evaluation and request from the authorized entity.

9. The method of claim 1, wherein storing further includes representing the control data structure as an mode.

10. The method of claim 9, wherein representing further includes using a first reserved field of the mode to house the public key and using a second reserved field of the mode to house the signature.

11. A method implemented in a non-transitory machine-readable storage medium and processed by one or more processors configured to perform the method, comprising:

detecting a file access request within a cloud storage environment from a principal;

verifying the principal is authenticated for access in the cloud storage environment;

accessing a control data structure for a file to which the file access request is directed;

obtaining a public key and a signature for the file from the control data structure;

using a private key housed in a secret store within the cloud storage environment for the principal to generate a new signature for the file, the private key provided to the principal while the principal is still authenticated and only when the principal is authenticated for an access session with the cloud storage environment;

subsequently for each file access request made by the principal within the cloud storage environment, the principal is re-authenticated;

verifying the signature against the new signature; and permitting the file access request of the principal to proceed based on verifying the signature against the new signature.

12. The method of claim 11 further comprising:
generating an audit event for the file access request;
signing the audit event with the private key of the principal; and
logging the audit event.

13. The method of claim 12 further comprising, using the logged audit event to generate reports, generate billing records, and/or provide proof of storage non-repudiation.

14. The method of claim 11 further comprising, updating the signature with a second signature within the control data structure when the file access request processes within the cloud storage environment as a file update.

15. The method of claim 11 further comprising, processing the method as a portion of a storage controller for the cloud storage environment.

16. The method of claim 11, wherein detecting further includes recognizing the principal as a process from a remote application server that has the cloud storage environment remote mounted over a network.

17. The method of claim 16, wherein recognizing further includes identifying the network as the Internet.

18. A system, comprising:
a cloud storage environment;
a storage controller implemented in a non-transitory machine-readable storage medium that processes on one or more processors of the cloud storage environment;
and a secret store implemented in a non-transitory machine-readable storage medium of the cloud storage environment;
the cloud storage environment configured to be remote mounted over a network with an application server of a principal when the principal authenticates with credentials,
the storage controller configured to maintain isles for the principal within the cloud storage environment,
each file having a control data structure and each control data structure having a public key for the principal and a signature for that file signed with a private key of the principal,
the public key and private key housed in the secret store and the public and private key supplied to the principal each time an access request is made by the principal and while the principal is still authenticated,
and only when the principal is authenticated for an access session with the cloud storage environment;
subsequently for each file access request made by the principal within the cloud storage environment, the principal is re-authenticated;
and the control data structures and the secret store used for providing storage non-repudiation.

19. The system of claim 18, wherein the storage controller generates an audit event for each file access attempt made by the principal for files within the cloud storage environment.

20. The system of claim 19, wherein the storage controller signs and logs each audit event with the private key of the principal obtained from the secret store.

* * * * *

UNITED STATES PATENT AND TRADEMARK OFFICE
CERTIFICATE OF CORRECTION

| | | |
|---|---|---|
| PATENT NO. | : 8,544,070 B2 | Page 1 of 1 |
| APPLICATION NO. | : 13/108094 | |
| DATED | : September 24, 2013 | |
| INVENTOR(S) | : Mukkara et al. | |

It is certified that error appears in the above-identified patent and that said Letters Patent is hereby corrected as shown below:

In the Claims

In column 10, line 58, in Claim 9, delete "mode." and insert --inode.--, therefor In column 10, line 60, in Claim 10, delete "mode" and insert --inode--, therefor In column 10, line 61, in Claim 10, delete "mode" and insert --inode--, therefor In column 12, line 4, in Claim 18, after "medium", delete "¶", therefor In column 12, line 6-7, in Claim 18, delete "environment;¶ and" and insert --environment; and--, therefor In column 12, line 14, in Claim 18, delete "isles" and insert --files--, therefor In column 12, line 23-24, in Claim 18, delete "authenticated,¶ and" and insert --authenticated, and--, therefor In column 12, line 28-29, in Claim 18, delete "re-authenticated;¶ and" and insert --re-authenticated; and--, therefor Signed and Sealed this
Twenty-second Day of April, 2014

Michelle K. Lee
*Deputy Director of the United States Patent and Trademark Office*